May 31, 1932.　　　A. D. MILLER　　　1,860,939
FLY SWATTER
Filed March 28, 1930
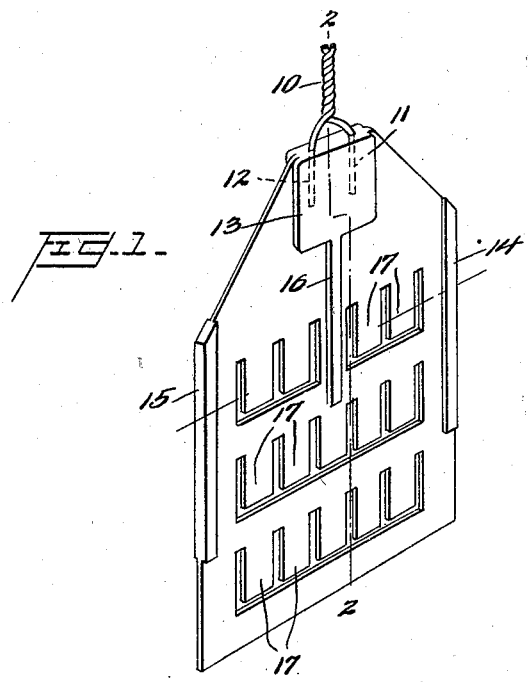
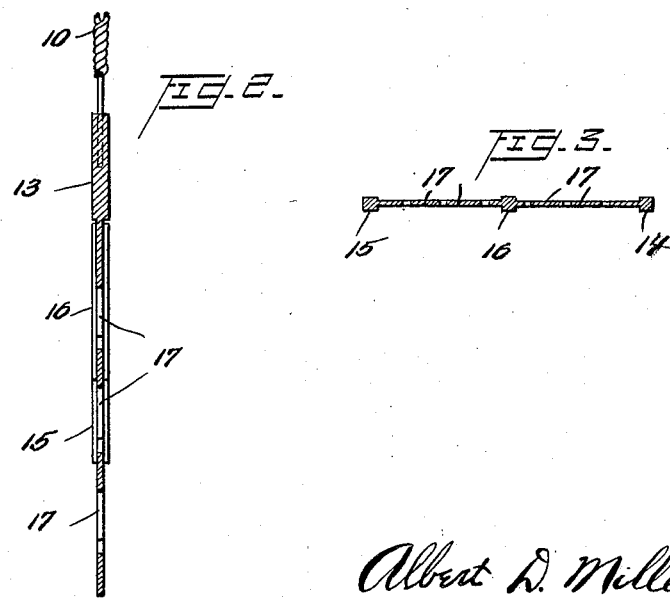
Inventor
Albert D. Miller,
By Wm D. Shoemaker
Attorney Patented May 31, 1932

1,860,939

UNITED STATES PATENT OFFICE

ALBERT D. MILLER, OF SULPHUR WELL, KENTUCKY

FLY SWATTER

Application filed March 28, 1930. Serial No. 439,826.

This invention relates to a fly swatter and more particularly to a head of such a swatter made of a flexible material such as rubber or the like.

It has for its object the provision of a head for a fly swatter which will kill the fly but which will not mash the fly to such an extent as to produce soil on the walls or woodwork.

Other objects and advantages of the invention will be hereinafter pointed out in the specification and the novel features thereof will be particularly pointed out in the appended claims.

Like reference numerals indicate like parts throughout the several figures of the drawings in which Fig. 1 is a perspective view of the head of a swatter, Fig. 2 is a section taken on the line 2—2 of Fig. 1, and Fig. 3 is a section taken on the line 3—3 of Fig. 1 looking in the direction of the arrow.

The handle 10 may be made of any suitable material stiff enough to enable manipulation of the swatter, but is shown as being of twisted wire strands, the ends 11 and 12 of which are embedded in a block 13 forming a part of the head of the swatter.

The shape of the head of the swatter is conventional. It is made of material having the qualities of sheet rubber and is provided with marginal ribs 14 and 15 and a central rib 16 on either side of the rubber sheet. These are to prevent the swatter head from striking the surface against which it is driven with a full and complete force which will mash the fly. It will be appreciated that these ribs also strengthen the sheet of rubber in such a way that it will present for the purpose of fly swatting a sufficiently stiff head.

The edge of the ribs are extended for approximately two-thirds of the distance from the top toward the bottom of the head, while the central rib is approximately one-half the distance from the top of the swatter toward the outer edge. It is shown as a continuation of the block 13.

The sheet of rubber or the like is cut with a plurality of U-shaped slits which define tongues or flaps 17, and it will be appreciated that the slits are wide enough to permit the passage of a substantial quantity of air through them in the handling of the swatter, but not sufficiently wide to avoid the injury to the fly. These flaps also have an independent swatting effect in that they follow, so to speak, the head of the swatter in its descent and catch the fly beneath them.

It will be appreciated that the escaping of flies from a swatting operation is substantially aided when the air is moved with the swatter toward the fly. This movement of the body of the air determines for the fly the direction which it must move to escape the force of a blow. By this principle of the invention a maximum amount of air is permitted to pass through the body of the swatter head so that the fly is not as likely to escape in a swatter head so provided as in one which causes the heavy movement of air before it. It will be appreciated that in the movement of the swatter the flaps are open and permit a larger movement of air through them than would be indicated by a view of the swatter as it appears at rest.

Another fact of fly swatting which should be borne in mind is that the blow is aimed to catch the fly centrally of the swatter. In this case the central portion of the swatter is for more than half its distance not provided with a central rib and for only two-thirds of the length of the head are ribs provided at its edges leaving a maximum of swatting surface at the very point where usually the fly is hit.

It will also be appreciated that by the use of rubber ribbed in the manner described with the flaps formed as shown, the swatter itself presents a minimum of liability to injury of the surface toward which it is driven. The fact that the flaps permit the escape of air not only aids in the killing of the fly but it also minimizes the required force with which the swatter is driven against a surface and when it is driven with this minimum force it is less liable to injure said surface than if it required greater force to drive it.

From the foregoing description the use of the swatter will be appreciated and a detailed description of its operation is not deemed necessary to a full and complete description of the invention.

It will be appreciated that the swatter may be used with advertising on either one or both sides of the body thereof.

What is claimed is:

1. In a fly swatter a head or flap made of a rubber-like material in sheet form and provided throughout the main portion of its surface with slits defining secondary flaps within the contour of the head or flap, permitting the escape of air therebetween and the secondary flaps having independent movement of their own in the swatting operation as well as movement as a part of the head or flap.

2. In a fly swatter a head made of a rubber-like material in sheet form having ribs at its sides extending for approximately two-thirds of the distance from the top of the head toward the bottom, and a central rib extending for one-half the distance from the top of the head toward the bottom.

3. The fly swatter of claim 1, wherein the head or flap is provided with strengthening and supporting ribs at the sides of the head and along its longitudinal center.

In testimony whereof I affix my signature.

ALBERT D. MILLER.